United States Patent

[11] 3,582,110

| [72] | Inventor | John F. Bryan, Jr. |
| | | 3212 Mapleleaf Circle, Dallas, Tex. 75233 |
| [21] | Appl. No. | 818,734 |
| [22] | Filed | Apr. 23, 1969 |
| [45] | Patented | June 1, 1971 |

[54] HITCHING SYSTEM
10 Claims, 5 Drawing Figs.

[52] U.S. Cl. ........................................... 280/408,
 105/3, 280/446, 280/456, 280/474
[51] Int. Cl. ................................................ B62d 53/00
[50] Field of Search........................................... 280/408,
 456, 446, 474; 105/3

[56] References Cited
UNITED STATES PATENTS
3,446,365  5/1969  Wriedt ........................  105/3

| 3,062,170 | 11/1962 | Verneaux .................. | 280/408X |
| 3,125,059 | 3/1964 | Verneaux .................. | 114/235 |
| FOREIGN PATENTS | | | |
| 850,112 | 9/1952 | Germany ................... | 280/408 |
| 958,619 | 2/1957 | Germany ................... | 280/408 |

*Primary Examiner*—Leo Friaglia
*Attorney*—Richards, Harris & Hubbard

ABSTRACT: Adjacent vehicles are connected by the engagement of a pair of jaws positioned at the front corners of one vehicle with a pair of pins positioned at the rear corners of the other vehicle. The jaws are mounted on a bar which is slidably supported for movement relative to the pins. Whenever one of the vehicles is turned, a lever slides the bar to disengage one of the jaws from one of the pins. This permits turning of the vehicles relative to each other about the other of the pins.

PATENTED JUN 1 1971

INVENTOR
JOHN F. BRYAN JR.

Richards, Harris & Hubbard
ATTORNEY

INVENTOR
JOHN F. BRYAN JR.

HITCHING SYSTEM

BACKGROUND OF THE INVENTION

In the air transportation industry, passenger baggage and other freight is usually carried to and from aircraft in trailers that are connected together and then towed in trainlike fashion. Heretofore such trailers have been interconnected by means of drawbars extending between adjacent trailers and between the first trailer in the train and the towing vehicle.

The use of drawbars to connect the trailers of such a train adds as much as 30 percent to the length of the train. This complicates storage and handling problems. More importantly, passenger baggage and other air freight is often carried in containers shaped to fit the interior of an aircraft. The containers are in turn carried to and from aircraft on trailers. Heretofore the loading of baggage and freight containers onto trailers has been complicated by use of drawbars to connect the trailers. The drawbars separate the trailers to such an extent that movement of containers from trailer to trailer is prohibited. Instead, each container must be positioned directly on the trailer that will carry it.

This invention relates to a hitching system in which trailers are positioned closely adjacent each other in a train. This facilitates the loading of containers onto the trailers by allowing containers to be loaded onto the last trailer in a train and then moved from trailer to trailer along the train to the first empty trailer.

SUMMARY OF THE INVENTION

In the preferred embodiment, this invention comprises a hitching system in which adjacent vehicles are connected together at two spaced points to position the vehicles closely adjacent each other and in which one of the connections is broken to permit turning of the vehicles. Preferably, the spaced points are located at the corners of the vehicles.

DESCRIPTION OF THE DRAWINGS

A more complete understanding of the invention may be had by referring to the following Detailed Description when taken in conjunction with the drawings wherein.

DETAILED DESCRIPTION

Figure 1:
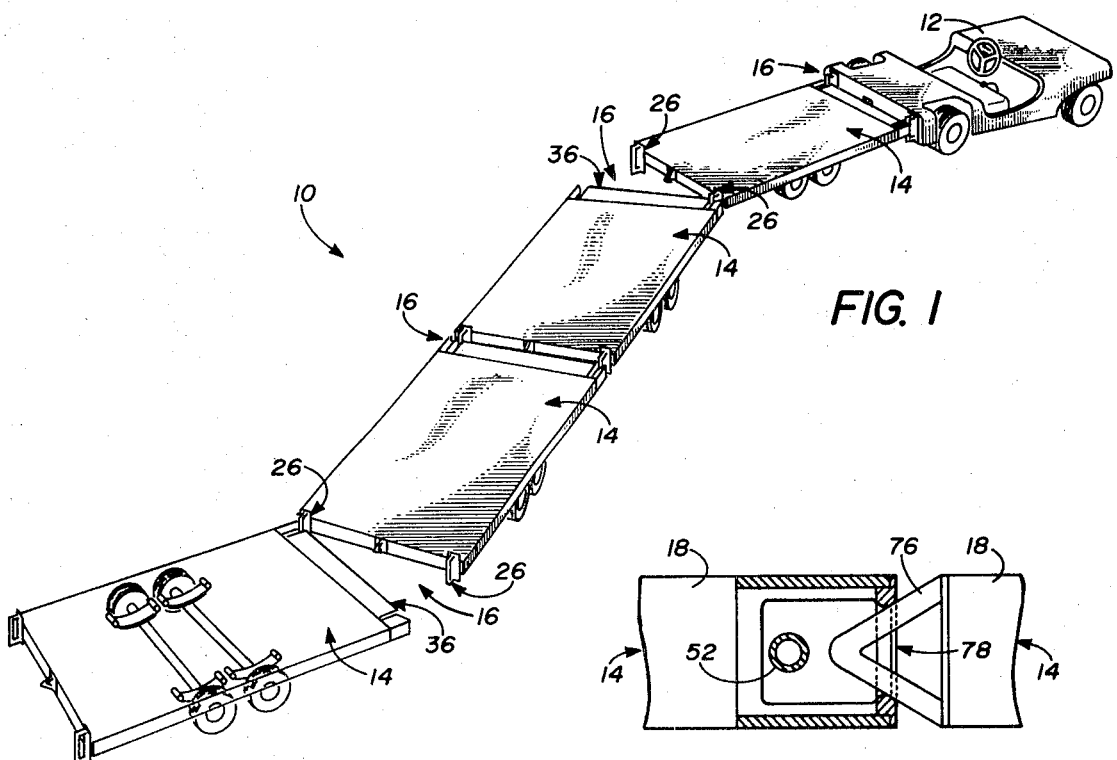
FIG. 1 is a perspective view illustrating the operation of a hitching system employing the invention.

Referring now to the drawings and particularly to FIG. 1 thereof, there is shown a trailer train 10 of the type used at air terminals to transport baggage and freight containers to and from aircraft. The trailer train 10 includes a towing vehicle 12 and a plurality of trailers 14. Each trailer 14 of the train 10 is hitched to the towing vehicle 12 or to another trailer 14 by a hitching system 16 employing the present invention. The hitching systems 16 position the trailers 14 closely adjacent each other in the train 10 while permitting the trailers 14 to turn in either direction relative to each other.

Figure 2:
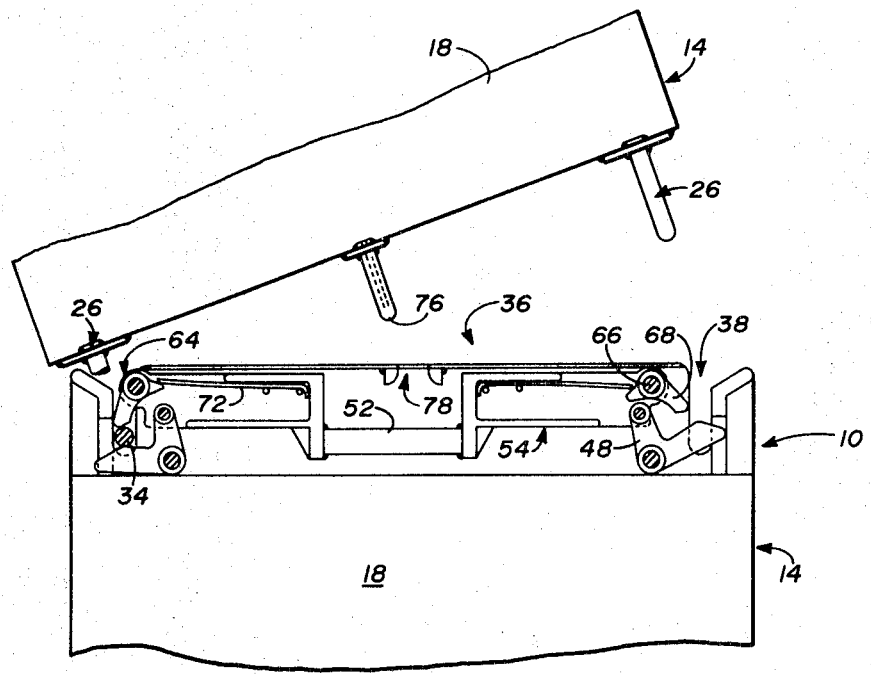
FIG. 2 is a top view illustrating the construction and operation of a hitching system employing the invention.
Figure 2:
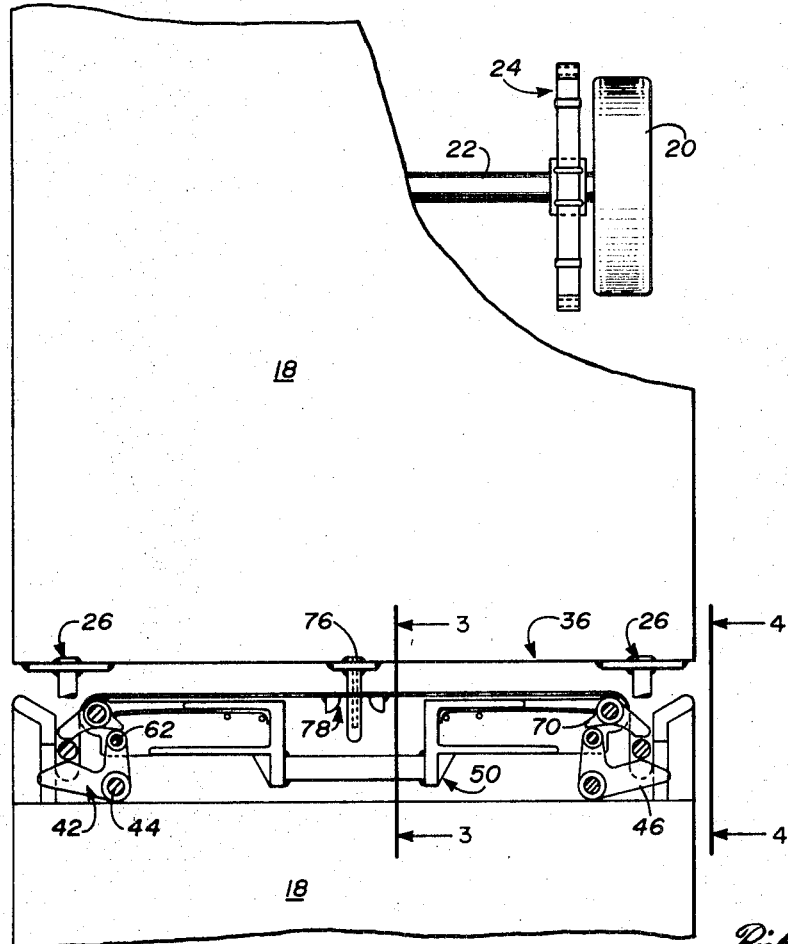

Referring now to FIG. 2, the details of the trailers 14 and of the hitching systems 16 are shown. Each trailer 14 includes a flat main body or bed 18. The bed 18 may be of any convenient length and width depending upon the size of the containers to be transported on the trailer 14. The bed 18 is supported by a plurality of wheels 20 which are in turn each rotatably supported on an axle 22. Each axle 22 is in turn secured to the bed 18 by a conventional leaf spring assembly 24.

Figure 4:
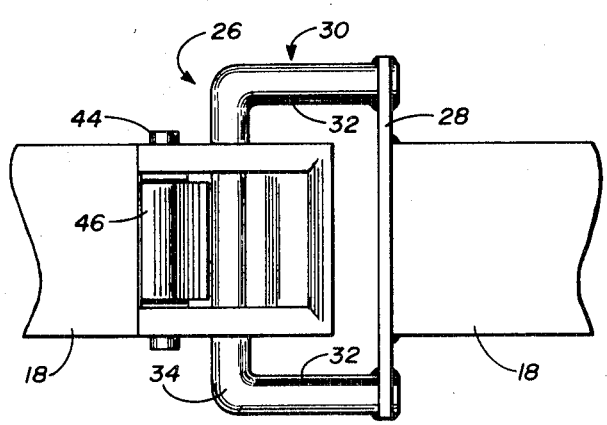
FIG. 4 is a view taken along the line 4—4 in FIG. 2 in the direction of the arrows.

Each hitching system 16 includes a pair of hitching members 26. As is shown in FIGS. 1, 2 and 4, each of the hitching members 26 includes a plate 28 which is welded or otherwise secured to the rear of the bed 18 of one of the trailers 14 or to the rear of the towing vehicle 12. A U-shaped member 30 is welded or otherwise secured to each plate 28. Each of the U-shaped members 30 includes a pair of horizontally extending legs 32 and a vertically extending pivot pin 34.

Figure 5:
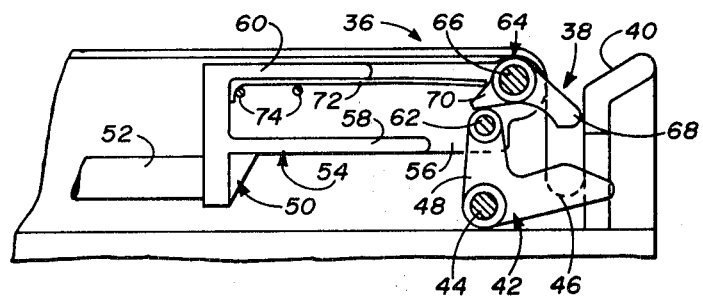
FIG. 5 is an enlarged view similar to FIG. 2.

Referring again to FIG. 2, each hitching system 16 further includes a hitching member gripping mechanism 36. The gripping mechanisms 36 each include a pair of slots 38 formed in the front of the bed 18 of one of the trailers 14. An inwardly slanting surface 40 leads into each slot 38. As is best shown in FIG. 5, a bellcrank 42 is pivotally supported adjacent each slot 38 by a pivot pin 44. Each bellcrank 42 includes an arm 46 extending into the adjacent slot 38 and an arm 48 extending perpendicularly to the arm 46.

The gripping members 36 further include a slidably supported bar 50 positioned at the front end of the bed 18 of each of the trailers 14. Each bar 50 includes a central round portion 52 and two flange portions 54 each extending outwardly from the central portion 52 (only one flange portion 54 is shown in FIG. 5). The flange portions 54 each include a bottom plate 56 and two side plates 58 and 60 extending upwardly from the bottom plate 56.

The arm 48 of each bellcrank 42 is pivotally connected to the adjacent bar 50 by a pivot pin 62 extending upwardly from the bottom plate 56 of one of the flange portions 54 of the bar 50. A jaw 64 is pivotally supported on each flange portion 54 by a pivot pin 66 extending upwardly from the bottom plate 56. Each jaw 64 includes a hitching member gripping arm 68 which extends toward the adjacent slot 38 and a spring receiving arm 70 which extends perpendicularly to the gripping arm 68. The jaw 64 is urged to pivot away from its corresponding bellcrank 42 by a leaf spring 72. The spring 72 is positioned between the side plate 60 and a pair of pins 74 extending upwardly from the bottom member 56 of the flange portion 54. The spring 72 extends into engagement with the spring receiving arm 70 of the jaw 64.

The operation of the hitching system 16 is best illustrated in FIG. 2. The trailers 14 of the trailer train 10 are hitched to each other and to the towing vehicle 12 by aligning the hitching members 26 of one vehicle with the slots 38 of an adjacent vehicle and then forcing the vehicles together. As the hitching members 26 enter the slots 38, the jaws 64 are initially pivoted against the action of the springs 72. When the pivot pins 34 clear the jaws 64, the jaws 64 are driven into the slots 38 by the springs 72. This traps each pivot pin 34 between a bellcrank 42 and a jaw 64. When all of the trailers of the train 10 have been connected either to an adjacent trailer or to the vehicle 12, each corner of each vehicle in the train is connected to a corner of an adjacent vehicle. This positions each trailer 14 in the train 10 closely adjacent the next trailer 14 in the manner illustrated in FIGS. 1 and 2.

Whenever one of the vehicles of the train 10 is turned relative to an adjacent vehicle, the turning forces between the vehicles crowd the hitching member 26 positioned at the inside of the turn deeper into its associated slot 38. As the pivot pin 34 of the inside hitching member 26 moves into the slot 38, it engages and pivots its associated bellcrank 42 about its pivot pin 44. Since the arm 48 of the bellcrank 42 is pivotally connected to the bar 50 by the pin 62, the bar 50 slides toward the direction of the turn as the bellcrank 42 pivots.

As the bar 50 slides toward the direction of the turn, the outside jaw 64 is moved out of its associated slot 38. This frees the outside hitching member 26 for movement out of its associated slot 38 which in turn permits adjacent vehicles in the train 10 to pivot relative to each other about the inside pivot pin 34.

As the turn is completed, the inside hitching member 26 tends to move out of its associated slot 38. This action causes the pivot pin 34 of the inside hitching member 26 to engage its associated jaw 64 and to drive the jaw 64 outwardly. The outward force of the pivot pin 34 on the inside jaw 64 combines with the force of the spring 72 on the jaw 64 to center the bar 50. During the terminal portion of the turn, the outside hitching member 26 moves into its associated slot 38. The pivot pin 34 of the outside hitching member 26 then moves behind its associated jaw 64 and is trapped in its associated slot 38.

Figure 3:
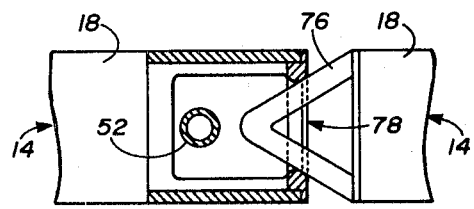
FIG. 3 is a sectional view taken along the line 3—3 in FIG. 2 in the direction of the arrows.

As is best shown in FIGS. 2 and 3, each hitching system 16 further includes a triangularly shaped member 76 positioned at the rear of each of the trailers 14 and a corresponding slot 78 positioned in the front of each of the trailers 14. As is shown in FIG. 3, the members 76 operate to limit the movement of the hitching members 26 into the slots 38 when both of the hitching members 26 are positioned in both of the slots 38 of the adjacent trailer. The members 76 may also be used to secure conventional trailer and drawbar assemblies to the rear of the last trailer 14 in the trailer train 10, if desired.

The hitching systems 16 need not be constructed as illustrated in the drawings. Instead, the systems may be constructed in accordance with any one of several modified versions of the invention. For example, each jaw 64 can be mounted on the plunger of a solenoid. In such a case, each solenoid is actuated upon the closure of a switch positioned at the end of the slot 38 on the opposite side of the trailer from the solenoid. Alternatively, the trailers may be made fully reversible by positioning a hitching member and an electrically operated jaw on opposite sides of each end of each trailer. In such a case, the jaws are actuated upon the closure of switches positioned at the ends of slots in the next adjacent trailer. This embodiment requires electrical cables extending between the trailers of the train. However, such cables are already provided in trailer trains in which lighting systems, directional turn indicating systems or stoplight systems are operated from the towing vehicle.

The hitching system illustrated in the drawings is superior to prior systems because it positions adjacent trailers closely adjacent each other in a trailer train and yet permits adjacent vehicles to turn relative to each other in either direction. The positioning of trailers closely adjacent each other in a train greatly simplifies the loading of containers onto the trailers by allowing movement of the containers between trailers. Thus, the train can be loaded by simply loading containers onto a convenient trailer and then sliding or rolling the container to the trailer that will transport it.

The hitching system 16 has several advantages in addition to positioning adjacent vehicles close to each other in the train 10 and to permitting turning in either direction. For example, use of the hitching systems reduces the overall length of the train by about 30 percent. This reduces the amount of space necessary for storing the train and also renders a train of given capacity much easier to handle in a limited space environment. Another advantage inherent in the use of the hitching system is that a train employing the system can be operated in reverse. It is well known that conventional drawbar hitching systems can be operated backwards only with great difficulty. A trailer train employing the illustrated hitching system can be operated in reverse as easily as it can be operated in the forward direction. By simply providing for the steering of the last vehicle in the train, the train can be made completely two-directional.

Although particular embodiments of the invention are illustrated in the drawings and described in the specification, it will be understood that the invention is not limited to the embodiments disclosed but is capable of rearrangement, modification and substitution of parts and elements without departing from the spirit of the invention. In particular, it will be understood that the invention is not limited to use in baggage trailer trains but may be used to connect any two vehicles.

What I claim is:

1. A system for hitching a pair of vehicles comprising:
   cooperating means on the vehicles for hitching the vehicles together at two spaced points, said cooperating means comprising a pair of cylindrical members and means for gripping the cylindrical members, and
   means responsive to turning forces between the vehicles for unhitching the vehicles at one of the points to permit turning of the vehicle.

2. The system according to claim 1 wherein the cooperating means hitches the vehicles at points adjacent the corners of the vehicles.

3. The system according to claim 1 wherein the unhitching means includes means for disengaging the gripping means from one of the cylindrical members.

4. The system according to claim 1 wherein the unhitching means unhitches the vehicles at one of the spaced points to permit turning of the vehicles relative to each other about the other of the points.

5. A hitching system comprising:
   a pair of vehicles,
   a first hitching member,
   a first jaw for cooperation with the first hitching member to hitch the vehicles together at a first point,
   a second hitching member,
   a second jaw for cooperation with the second hitching member to hitch the vehicles together at a second point, and
   means responsive to the turning of one of the vehicles with respect to the other for disengaging one of the jaws from its corresponding hitching member.

6. The hitching system according to claim 5 wherein each of the hitching members includes a vertically extending cylindrical portion and wherein jaws hitch the vehicles by engaging the cylindrical portions.

7. The hitching system according to claim 6 wherein both of the jaws are mounted on one of the vehicles and both of the hitching members are mounted on the other of the vehicles.

8. The hitching system according to claim 7 wherein the jaws are mounted on a bar which is slidably supported on the one of the vehicles and wherein the disengaging means shifts the bar with respect to the one of the vehicles to disengage the jaws from the hitching members.

9. The hitching system according to claim 8 wherein the disengaging means includes a pair of levers each mounted on the one of the vehicles for engagement by one of the jaws to shift the bar.

10. In a hitching system of the type wherein at least two vehicles are connected one to the other to form a train, the improvement comprising:
    means for gripping a pair of cylindrical members located at spaced points to connect the vehicles closely adjacent each other in the train,
    means responsive to turning forces between the vehicles for disengaging one of the above cylindrical members and thereby facilitating pivoting the vehicles relative to each other about the other cylindrical member.